F. J. WALLING.
PIPE FITTING.
APPLICATION FILED OCT. 24, 1917.
1,276,291. Patented Aug. 20, 1918.
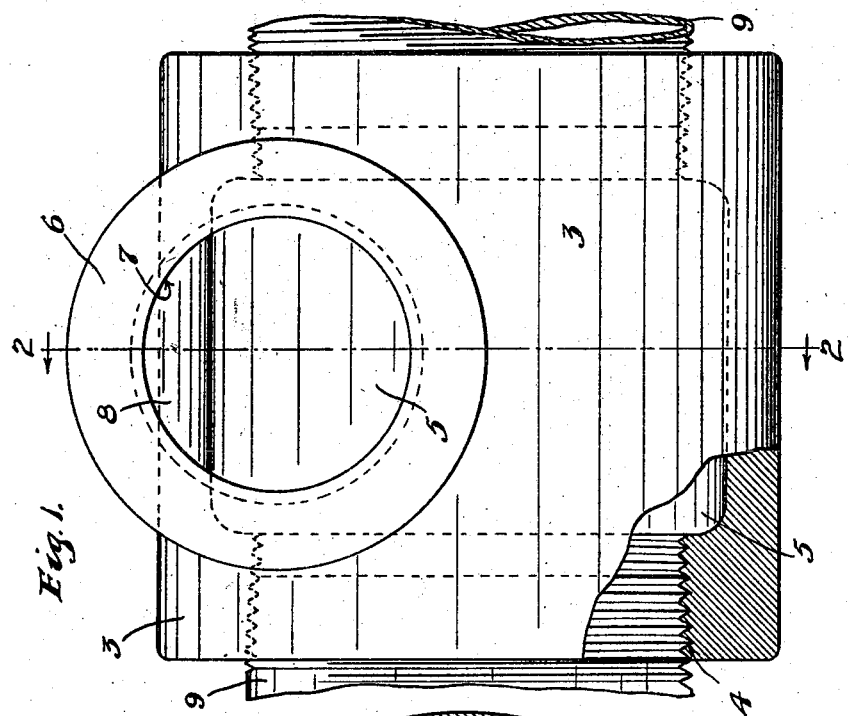
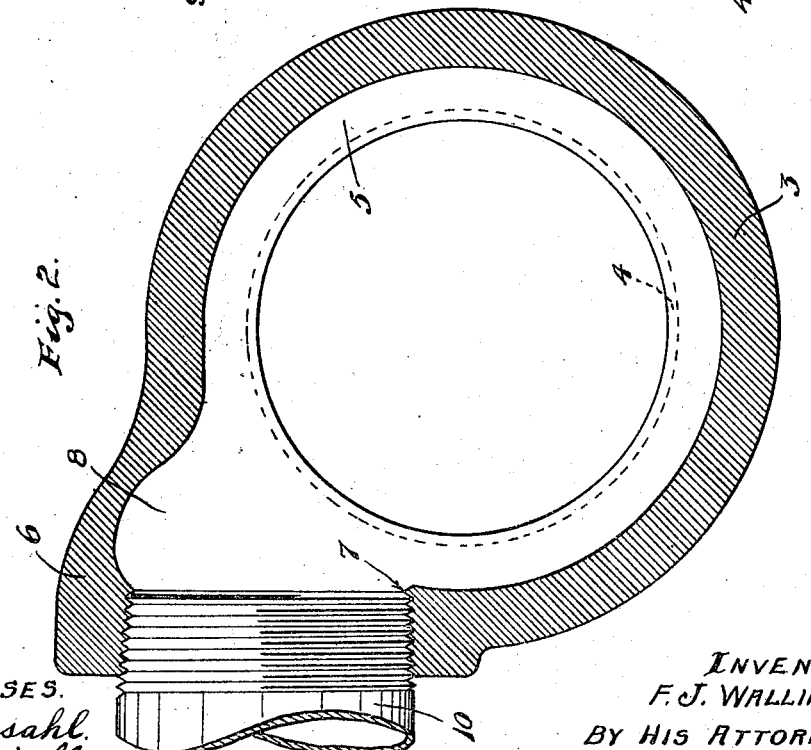
WITNESSES.
H. L. Opsahl.
E. C. Wells
INVENTOR
F. J. WALLING.
BY HIS ATTORNEYS
Williamson Merchant

UNITED STATES PATENT OFFICE.

FREDERICK J. WALLING, OF LOMAX, ILLINOIS.

PIPE-FITTING.

1,276,291. Specification of Letters Patent. Patented Aug. 20, 1918.

Application filed October 24, 1917. Serial No. 198,248.

*To all whom it may concern:*

Be it known that I, FREDERICK J. WALLING, a citizen of the United States, residing at Lomax, in the county of Henderson and State of Illinois, have invented certain new and useful Improvements in Pipe-Fittings; and I do hereby declare the following to be a full, clear, and exact description of the invention, such as will enable others skilled in the art to which it appertains to make and use the same.

My invention has for its object to provide an extremely simple and highly efficient pipe fitting intended for general use, but especially adapted for use in connecting branch pipes to the main pipes of steam and hot water systems, wherein it is highly desirable to have the branch pipe located above the main pipe, in order to obtain the proper circulation.

To the above end, generally stated, the invention consists of the novel devices and combinations of devices hereinafter described and defined in the claims.

In the accompanying drawings, which illustrate the invention, like characters indicate like parts throughout the several views.

Referring to the drawings,

Figure 1 is a fragmentary outside elevation showing the improved pipe fitting connecting two main pipe sections; and Fig. 2 is a view in section taken on the line 2—2 of Fig. 1, with some parts removed.

The improved pipe fitting 3 is, as shown, in the form of an integrally formed 45 degree T having internal threads 4 in its main ends. The main body of the fitting is internally expanded between its screw-threaded ends to afford a chamber 5. The branch 6 of this fitting is provided at its outer end with internal screw threads 7 and said branch, between its screw threads 7 and chamber 5, is circumferentially expanded to afford a passageway 8. As shown, the main body of the fitting connects two main pipe sections 9 and a branch pipe 10 is connected thereto by its branch 6.

In order to make the fitting compact, the outer end of its branch 6 is substantially tangential to the outer wall of the main body of the fitting. It is also important to note that the inner end of the screw threads 7 terminates substantially on the line that is tangential to the inner wall of the chamber 5 and the projected axis of the branch 6 is substantially tangential to the inner walls of the ends of the main body of the fitting. The purpose of increasing the diameter of the passageway 8 over that of the outer end of the branch 6 is to permit the screw threads 4 to be cut. By terminating the inner end of the screw threads 4, substantially on a line that is tangential to the inner wall of the chamber 5, it is possible to connect the branch pipe 10 thereto, without having its inner end project into the main pipe line, and thereby obstruct the same.

The above described single pipe fitting takes the place of the customary T, nipple and 45 degree elbow, thereby reducing the cost of installation, both in material and labor.

What I claim is:—

1. A pipe fitting comprising a T, a screw thread in the branch of said fitting, terminating at its inner end substantially in a plane that is tangential to the inner wall of the main body of said fitting, the channel leading from the main cavity to the said threaded branch being outwardly expanded.

2. A pipe fitting comprising a T having a channel leading from its main chamber to its threaded branch, the said channel being outwardly expanded, the screw thread in the said branch terminating at its inner end substantially in a plane that is tangential to the inner wall of said main chamber, and the projected axis of said threaded branch being approximately tangential to the inwardly projected cylindrical surface of the main end threads of said fitting.

In testimony whereof I affix my signature in presence of two witnesses.

FREDERICK J. WALLING.

Witnesses:
W. J. EMERSON,
E. E. WANDERS.

Copies of this patent may be obtained for five cents each, by addressing the "Commissioner of Patents, Washington, D. C."